(12) United States Patent
Perkins et al.

(10) Patent No.: US 6,209,286 B1
(45) Date of Patent: Apr. 3, 2001

(54) MACHINE AND METHOD FOR MANUFACTURING A CONTINUOUS PRODUCTION OF PNEUMATICALLY FILLED INFLATABLE PACKAGING PILLOWS

(75) Inventors: Andrew Perkins, Berkeley; Nicholas P. De Luca; Philipp Borchard, both of San Francisco, all of CA (US)

(73) Assignee: Novus Packaging Corporation, Cambridge, MA (US)

( * ) Notice: Subject to any disclaimer, the term of this patent is extended or adjusted under 35 U.S.C. 154(b) by 0 days.

(21) Appl. No.: 09/439,552

(22) Filed: Nov. 12, 1999

Related U.S. Application Data
(60) Provisional application No. 60/123,497, filed on Mar. 9, 1999.

(51) Int. Cl.$^7$ ............................. B65B 31/00; B65B 31/06
(52) U.S. Cl. .................................. 53/403; 53/79; 53/202; 53/450; 53/553; 428/35.2; 428/178; 156/145
(58) Field of Search .............................. 53/79, 202, 450, 53/459, 472, 553, 403; 428/35.2, 178; 156/145

(56) References Cited

U.S. PATENT DOCUMENTS

| | | |
|---|---|---|
| Re. 36,501 | 1/2000 | Hoover et al. . |
| 3,389,534 | 6/1968 | Pendleton . |
| 3,575,757 | 4/1971 | Smith . |
| 3,667,593 | 6/1972 | Pendleton . |
| 3,817,803 | 6/1974 | Horsky . |
| 3,938,298 | 2/1976 | Luhman et al. . |
| 4,017,351 * | 4/1977 | Larson et al. .......................... 156/494 |
| 4,096,306 | 6/1978 | Larson . |
| 4,169,002 | 9/1979 | Larson . |
| 4,415,398 | 11/1983 | Ottaviano . |
| 4,850,912 * | 7/1989 | Koyanagi ................................ 441/40 |
| 5,203,761 | 4/1993 | Reichental . |
| 5,216,868 | 6/1993 | Cooper et al. . |
| 5,340,632 | 8/1994 | Chappuis . |
| 5,581,983 | 12/1996 | Murakami . |
| 5,693,163 | 12/1997 | Hoover et al. . |
| 5,755,082 | 5/1998 | Takahashi et al. . |
| 5,824,392 * | 10/1998 | Gotoh et al. .......................... 428/178 |
| 5,937,614 | 8/1999 | Watkins et al. . |
| 6,015,047 * | 1/2000 | Greenland ............................. 206/522 |

* cited by examiner

*Primary Examiner*—Peter Vo
*Assistant Examiner*—Hemant M. Desai
(74) *Attorney, Agent, or Firm*—Thomas C. Feix; Donald C. Feix

(57) ABSTRACT

A machine and method for the manufacture of a continuous production of pneumatically filled packaging pillows for use as void fill packaging for the safe shipping of articles. A strip of flattened preformed film material with a repeated sealing pattern is advanced along a path through the machine and include a common inflation channel that is guided onto a longitudinally extending inflation tube at a first station. The inflation tube has an orifice through which pressurized air is expressed in controlled fashion to inflate pillow chambers that emanate off the common inflation channel of the film material. The film material is advanced to a second station where continuous longitudinally extending heat seals are formed in the film material in a manner to trap and confine a quantity of air inside the inflated pillow chambers. The film material is then advance to a third station where the common inflation channel is slit open in order to release the film material from the inflation tube of the machine. An advantageous aspect of the invention is that the film material is advanced along the path from station to station in a continuous motion.

25 Claims, 9 Drawing Sheets

MACHINE AND METHOD FOR MANUFACTURING A CONTINUOUS PRODUCTION OF PNEUMATICALLY FILLED INFLATABLE PACKAGING PILLOWS

CROSS REFERENCE TO RELATED U.S. APPLICATIONS

The co-pending application Ser. No. 09/207,129 filed Dec. 8, 1998 and entitled "METHOD AND APPARATUS FOR MANUFACTURING AIR-FILLED SHEET PLASTIC SHIPPING CUSHIONS AND THE LIKE", Nicholas P. De Luca and Andrew Perkins inventors, is incorporated by reference in this application.

Subject matter in this application was originally filed in provisional patent application Ser. No. 60/123,497, filed on Mar. 9, 1999.

TECHNICAL FIELD

The present invention relates to a machine and method for making a continuous production pneumatically filled sheet plastic cushions or pillows for the shipping and storage of delicate articles; being more concerned with structures, apparatus and techniques of the type disclosed in earlier U.S. Pat. Nos. 5,454,642, 5,651,237, and 5,755,328 of the commonly assignee herewith, (systems employing a plastic thin film substrate in conjunction with machinery to automate or semi-automate the packaging of items within cushions of air formed and bounded by such substrates), and to improvements thereon.

BACKGROUND OF THE INVENTION

The use of air-filled envelopes, cushions, and pillows (herein collectively referred to as "inflatables") for packaging and shipping has, in the past 10 years, become reality through the use of thin film plastics which are inexpensive, tough, resilient, and recyclable. Such inflatables are created using heat sealed bags from these plastic films and can be advantageously used for void-fill packaging to replace products such as crumpled paper or polystyrene peanuts and for protective packaging to replace products such as molded or extruded foams. Overall, inflatables offer cost advantages over conventional materials because of their minimal storage volume and inherent minimal material usage.

The difficulties in creating inflatable packaging are generally related to the inflation process. In accordance with the conventional technique, two layers of the plastic film are formed together as tubing which is then divided into sections to create individual bags that must be inflated at the user site. The air must be sealed shut within the bag. Conventionally, this is accomplished by using valves or by heat sealing the plastic tubing during inflation. Inherently, this inflation process is slow and causes intermittent production of the air-filled bags or pillows rather than continuous production.

In accordance with one prior art technique, the inflation for each bag is accomplished by inserting air nozzles or needles into the plastic substrate of the material or into the valves. The step of inserting the air nozzle or needle into the substrate material or valving for each individual bag requires that the bags be stationary for best results. This adds complexity to the machine and reduces the robustness of the inflation system. In addition, the time cycle associated with the inflation process can be on the order of 2 to 10 seconds and this adds additional production delay. Furthermore, it is difficult to insert a needle into the valve or through the wall of the flexible tubing without pricking the tubing material a second time. A machine and method which eliminates the use of air nozzles and needles for pressurizing inflatable packages and which further allows for continuous production of several air-filled bags simultaneously would constitute a significant advance in the art.

Once the inflatable bag has been pressurized with air, the bag must be sealed to capture the pressurized air in the bag. In accordance with one conventional technique, one way valves, such as those described in U.S. Pat. No. 5,755,328, are used to keep air inside the inflated bag. However, such valves are prone to leakage problems. Moreover, the use of valves add significantly to the cost to produce each bag. In addition, both flutter valves and solid rigid valves, because of their thickness, tend to complicate and inhibit the compact folding or roll-up capability of the deflated end-to-end packages such as those disclosed in U.S. Pat. No. 5,454,642. Accordingly, a machine and method which allows for the continuous production of inflatable packages from a compact roll of adjacent and connected deflated inflatable preformed plastic film material would be desirable.

One alternative to using valves in the inflatable bags is to heat seal the upper and lower film layers of the preformed bag together so that the air is trapped within the bag to form the inflated package. In general, the process of heat sealing bags is time consuming and requires a minimum of 1 to 2 seconds to accomplish for polyethylene based films of thicknesses ranging from 0.001 to 0.003 inches. In addition, the handling and positioning of the film can require an additional 1 to 5 seconds. To the inventors' knowledge, techniques for heat sealing continuously moving polyethylene based films has not been perfected for inflatable packaging applications. One difficulty encountered in forming a heat seal in moving plastic sheet is maintaining the delicate balance of temperature, pressure and duration necessary to ensure a strong and reliable bond as the material is moving (often at variable speeds) relative to the heat seal apparatus. If the heating element is too hot or the applied pressure is too great, the plastic simply melts completely through or the seam rips open. If the heating element is not hot enough, the fuse area of melted plastic between the sheets to be joined does not hold and the seam fails. Another factor which complicates the heat sealing process of moving plastic sheet material is the internal inflation pressure of the adjacent air filled cavity which has a tendency to pulls apart the newly heat sealed seam.

In order to reduce costs of packages, some systems avoid preforming the inflatable plastic bags prior to the customer end-use and instead use a single continuous sheet of plastic film that has been folded lengthwise with the edges joined together to form tubing from which bags are created at the time of need. The film is fed into a machine and divided into bag sections which are individually inflated and heat sealed perpendicularly to the length of the tubing thus creating a chain of inflated packets. Such systems are slow because they require individual inflation and heat sealing of each bag section perpendicularly to the direction of the movement of the film (tubing). In consequence, the film must either be stopped to heat seal it shut, or an oscillating sealing station must be used which moves in the direction of the film.

The present invention is directed to machine and method for the manufacture of a continuous production of pneumatically filled pillows from a strip of flattened preformed film material of adjacent and connected inflatable plastic pillow sections, wherein the individual pillows of the pillow sections are heat sealed in the same direction of movement of the film material in order to confine the gas therein.

SUMMARY OF THE INVENTION

It is among the objects of the invention to provide a machine for making, at low cost, a production of pneumatically filled packaging pillows from a sheet of preformed film material of adjacent and connected uninflated inflatable flat bag assemblies or pillow sections, and wherein the pneumatically filled pillows are useful for both void-fill and protective packaging applications.

It is related object of this invention to provide a method of producing pneumatically filled packaging pillows from preformed plastic film material wherein individual bag or pillow sections of the film material are inflated and sealed closed as the film material is in continuous motion.

Briefly, the invention employs a strip of preformed plastic sheet or film material such as is disclosed in U.S. Pat. No. 5,454,642 for use in the continuous production of inflatable packaging pillows. Such preformed film material is most commonly composed of an upper and a lower sheet and is patterned with heat seals to form a plurality of adjacent and connected inflatable flat bag assemblies or pillow sections. Each pillow section includes two pillow chambers disposed on either side of a common longitudinally extending inflation channel. The heat seals form the periphery of the pillow chambers and also form a necked-down area or entrance port that connects each pillow chamber to the common inflation channel. The adjacent pairs of pillow chambers of each pillow section are separable from the adjacent and connected pillow sections via perforations placed perpendicularly to the length of the film material and are also separable from one another by perforations located along the length of the common inflation channel.

The inflatable flat pillow sections can, in addition, be modified to incorporate secondary heat seals inside the periphery of each pillow chamber so that when the pillow chambers are inflated a modified pillow shape results. This allows for the creation of pneumatically filled packages which resemble "bubble-wrap" and also for the creation of specialty packages.

The peripheral seals of the flat pillow sections are generally formed using a platen or impulse heat sealing press on plastic sheets commonly ranging in thickness from 0.008 to 0.001 inches. The seals that define the common inflation channel are formed to overlap end to end to create an infinitely extended channel area with sequential pillow chambers emanating from the common inflation channel. Once the strip of plastic material has been pressed to form the adjacent and connected flat pillow sections the resulting "formed" film material can either be wound on a roll or folded to create a stack of units. In accordance with an advantageous aspect of the invention, the preformed film material can be compactly rolled or folded since bulky valves are not present.

The machine for creating the inflated packages or pillows includes a pair of closely spaced idler rollers that extend perpendicularly to the direction of the film material length and through which the material is fed. As the flattened preformed film material is advanced through the machine, the open end of the common inflation channel of the film material is first guided over an inflation tube at a first station. The inflation tube extends longitudinally in the direction of the length of the film and is connected to an air source. The tip or inserted end of the inflation tube is provided with a Teflon) ball. The ball or adjacent area of the inflation tube is provided with an orifice or nozzle through which pressurized air or other suitable gas is introduced into the common inflation channel of the film material and subsequently into the adjoining pillow chambers via the respective ports of each pillow section as the film material advances along the inflation tube.

The film material is then pulled over the tube for approximately five to ten inches and then is fed through a secondary set of driven nip rollers or wheels located on either side of the tube. As the film material is griped by the nip rollers, it is pulled further "down-stream" through a heat sealer or seal forming apparatus at a second station. The seal forming apparatus is operative to form a pair of spaced apart continuous seals that extend in the longitudinal direction (direction of travel) of the film material. Each seal is parallel to and adjacent the respective channel seals of the common inflation channel. The two continuous seals formed by the seal forming apparatus effectively close off the respective transversely oriented openings or ports thereby capturing a quantity of the pressurized air within the respective pillow chambers. In order to allow for the removal of the central channel from the tube, the film material is advanced to a third station at which there is a blade, generally positioned at an angle along the tube adjacent the driven nip rollers. As the film is pulled by the nip rollers, the bottom layer (and/or top layer if desired) of the two ply construction is (are) slit open, thus allowing the now inflated pillow sections to release from the inflation tube at the third station.

The inflated pillow sections are then ejected from the machinery on a single unit (i.e. pillow) basis by tearing along the line of perforations located between adjacent pillow sections and also along the non-slit perforated layer of the common channel. Alternatively, the inflated pillow sections can be ejected uncut into a collection bin so that a user can determine the length required and separate the units as needed.

In addition, the pneumatically filled pillow sections can be folded along the center channel and then passed through a secondary set of rotary heat sealers to seal the external peripheral edges and create the dual pouch protective packaging described by De Luca in U.S. Pat. No. 5,454,642. These packaging units also being automatically or manually separated.

The machine as described herein for creating the inflated packages utilizes a continuous process with cycle times ranging on the order of 1 to 2 seconds per package. The machine can also be made to create packages of a predetermined length by simply engaging or disengaging the drive mechanism at a regulated interval.

In accordance with one advantageous aspect of the invention, the introduction of air or gas into the pillow sections is accomplished by pulsing the air in several discreet bursts in order to increase the air flow pressure into bags without increasing the total airflow volume. We have found that the use of this "pulsing" process yields a higher percentage of fully inflated bags or pillows with low incidence of popping or bag breakage. The pulsing of the bags or pillows also facilitates the controlled movement of the inflated pillow sections through the machine without bunching up at the drive rollers.

Methods and apparatus which incorporate the features described above and which are effective to function as described above constitute specific objects of this invention.

Other and further objects of the present invention will be apparent from the following description and are illustrated in the accompanying drawings, which by way of illustration, show preferred embodiments of the present invention and the principles thereof and what are now considered to be the best modes contemplated for applying these principles.

Other embodiments of the invention embodying the same or equivalent principles may be used and structural changes may be made as desired by those skilled in the art without departing from the present invention and the purview of the appended claims.

BRIEF DESCRIPTION OF THE DRAWINGS

The invention will now be described in connection with the accompanying drawings in which.

DESCRIPTION OF THE PREFERRED EMBODIMENTS

The terms "pillows", "bags", and "cushions" are used interchangeably in the following description. The pneumatically filled pillows manufactured by the machine and method of the present invention originate from a strip of preformed plastic sheet or film material.

Figure 1:
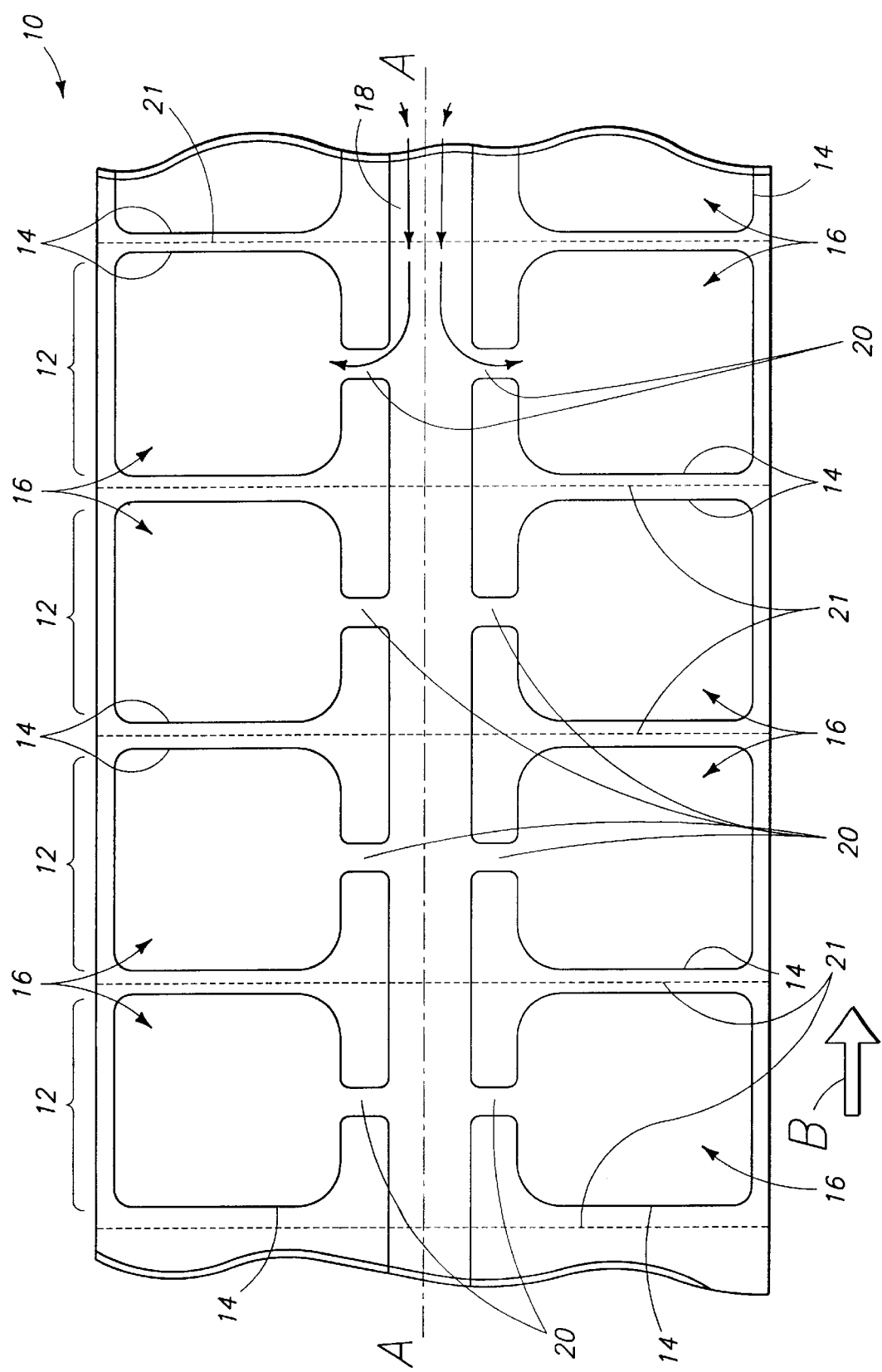
FIG. 1 is plan view of a strip of sheet material of adjacent and connected preformed inflatable packaging in accordance with a first embodiment of the present invention.

FIG. 1 is a plan view of a strip of flattened preformed film material 10 provided with a sealing pattern of four adjacent and connected inflatable flat pillow sections 12 (a fifth flat pillow section is partially shown at the far right of the figure). As will be described in greater detail below with reference to FIG. 2, the film material 10 is preferably formed from two sheets of superimposed film layers, although the film material may also be formed from a single sheet of plastic film which is folded in the lengthwise direction with the edges joined together to form a tube. Most preferably, because of ease of recycling and ease of sealability characteristics, a high density or low density polyethylene film material having thickness ranging from 0.001 to 0.008 inches is used.

Each of the flat pillow sections 12 of the patterned strip of film material 10 include continuous heat seals 14 which define two pillow chambers 16 emanating off of a common inflation channel 18. The common inflation channel 18 is centrally oriented along the longitudinal axis A—A of the patterned strip 10 and is in general alignment with the direction of travel of the strip 10 (indicated by arrow B) through the inflation and sealing apparatus (to be described infra). The pillow chambers 16 are connected to the common inflation channel 18 via respective entrance ports 20 which are oriented in the transverse (or widthwise) direction of the patterned strip 10 and perpendicular to the direction of travel (arrow B). With the above described patterned strip 10, the pillow chambers 16 will inflate equally upon ingress of air through the common inflation channel 18 and the respective ports 20. The patterned strip 10 is further provided with perforations or score lines 21 that define the transverse or lateral edge boundaries of the flat pillow sections 12. Optionally, a perforation or score line (not shown) may run the length of the common inflation channel 18.

Figure 2:
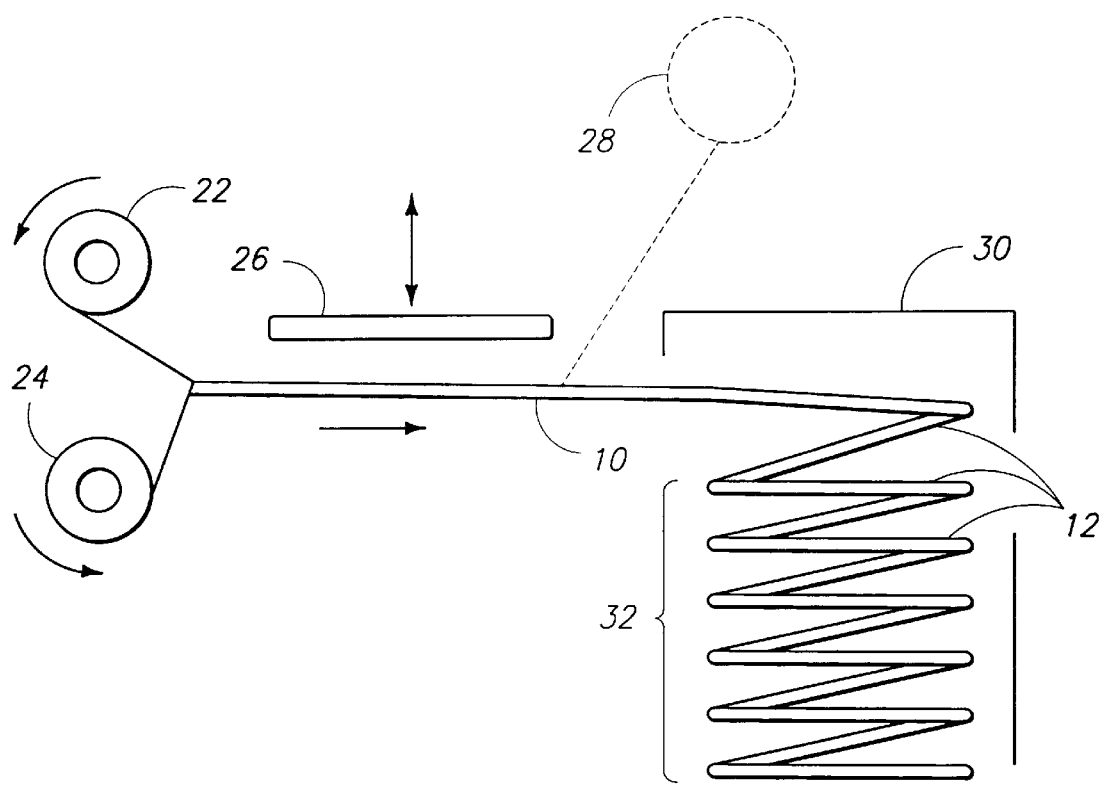
FIG. 2 is a block diagram illustrating a means of making the sheet material of adjacent and connected deflated inflatable plastic pillow structure of the present invention.

FIG. 2 illustrates a method of making the patterned strip 10 of adjacent and connected flat pillow sections 12 shown in FIG. 1 wherein single wound plastic sheeting of rolls 22 and 24 are layered, one a top the other, and pressed together with a stamp member 26. Stamp member 26 may comprise either a flat platen, die, or a rotary sealer which is heated by using impulse nichrome wire or by using constant heat cartridges. The perforated or score lines 21 shown in FIG. 1 can also be formed using a die (stamp member 26) or can be added later as desired. The completed patterned strip 10 is then either wound onto a roll 28 or folded using folder 30 and stacked into a bundle 32. It is important that the indexing of the preformed sheet material create a continuous longitudinally oriented inflation channel 18 and that the leading end of the inflation channel 18 in each pillow section 12 have an uninterrupted connection with the trailing end of the inflation channel 18 in the connected and adjacent flat pillow section 12.

Figure 3:
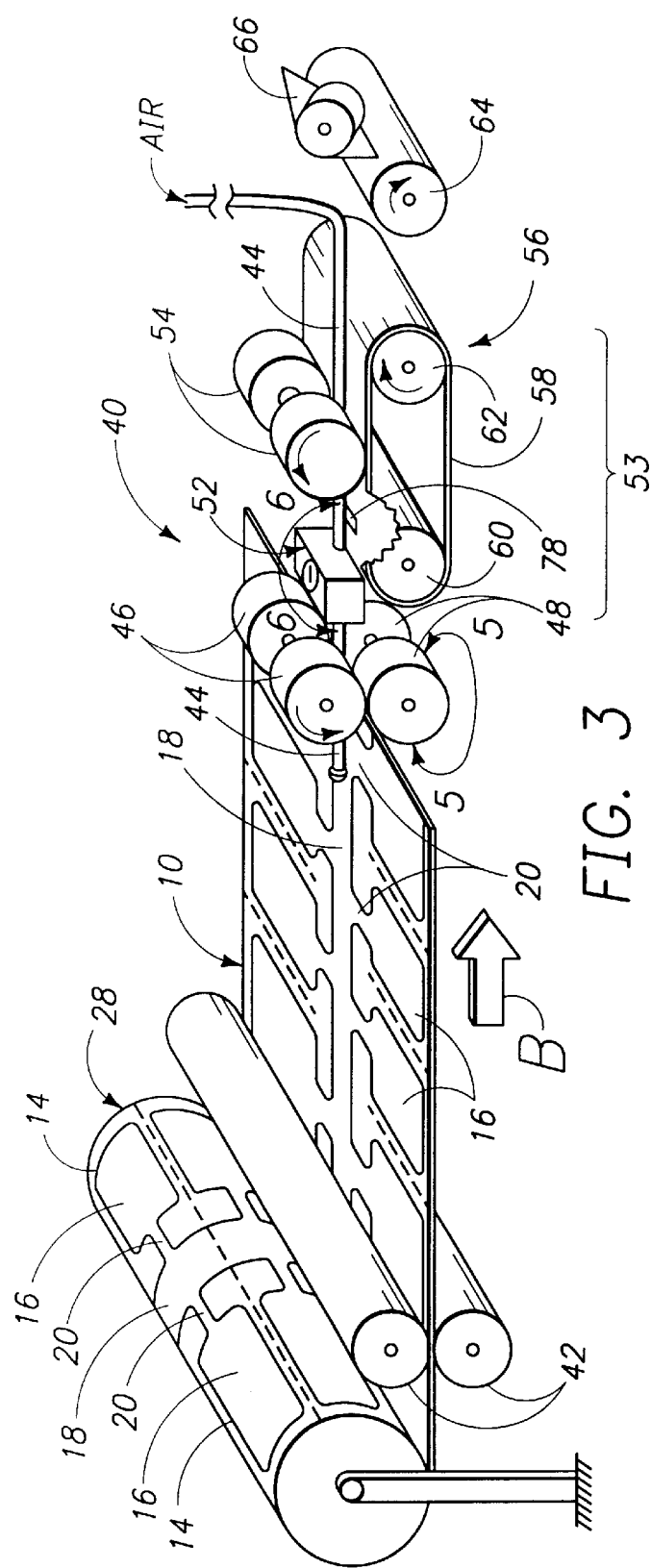
FIG. 3 is an isometric view of a machine in accordance with the present invention for manufacturing air-filled sheet plastic shipping pillows or cushions in a continuous manner from a roll of film material formed by the apparatus of FIG. 2.
Figure 4:
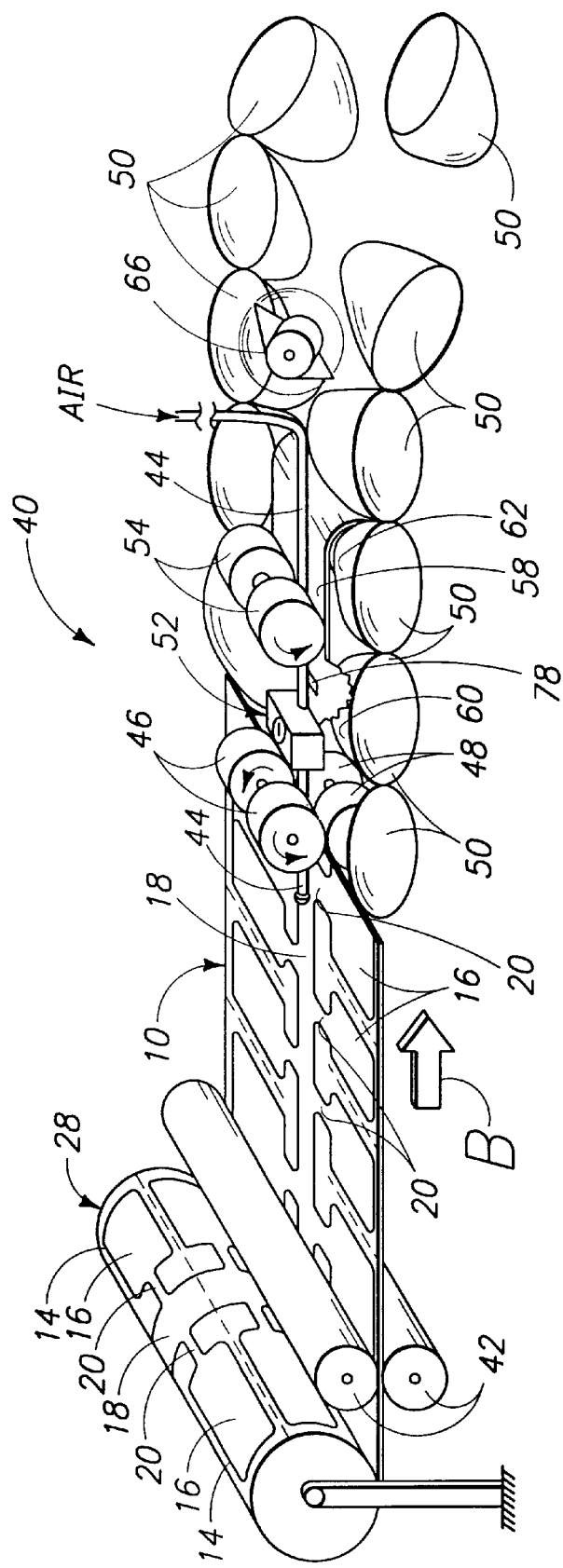
FIG. 4 is an isometric view of the machine similar to that shown in FIG. 3 and also showing the film being advanced, inflated, sealed, and separated.

FIGS. 3 and 4 illustrate a machine 40 for manufacturing a continuous production of pneumatically filled packaging pillows in accordance with a first embodiment of the present invention. The strip of flattened preformed film material 10 created in FIG. 2 is compactly wound onto roll 120 and placed at one end of the machine 40. The preformed film material 10 is advanced along a path through the machine 40 and is first fed between a set of tightly spaced nip rollers 42. The opening to the common inflation channel 18 of the preformed sheet of material 10 is guided onto inflation tube 44 at a first station and is pulled further into the machine 40 by a first set of drive rollers 46. The drive rollers 46, in combination with the closely spaced pair of free spinning idler wheels or rollers 48, provide a direct drive means for advancing the preformed sheet material 10 along the inflation tube 44 in the direction of travel indicated by arrow B and at a rate substantially equal to the rotational speed of the drive rollers 46.

Figure 5:
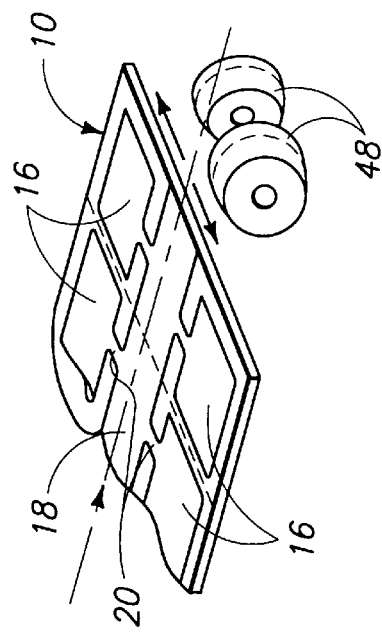
FIG. 5 is an enlarged detail view of the region encircled by arrow 5—5 in FIG. 4 showing the first set of driver rollers for advancing the film through the primary apparatus.

As best seen in FIG. 5, the film contacting surfaces of the idler rollers 48 are crowned in the center to provide a means for keeping the central section of the sheet material 10 laterally taut by imparting a desired outward lateral tension to the sheet material 10 along both sides of the common inflation channel 18. Lateral tautness of the common inflation channel 18 is important in this region as the introduction of pressurized air (or other suitable gas) causes substantial shrinkage of the preformed sheet material 10. Stated in another way, the outward lateral tension on the sheet material 10 (indicated by arrows) imparted by the crowned idler rollers 48 keeps the sheet material 10 from bunching up at the drive rollers 46. It is also important to keep this central region of the sheet material 10 as flat as possible in order make a longitudinal heat seal to close off the ports 20 after inflation of the pillow chambers 16.

A seal forming apparatus, generally indicated by reference arrow 52 in FIGS. 3–4, is located downstream of the first set of drive rollers 46 and defines a second station of the machine 40. The seal forming apparatus 52, through a combination of light pressure and heat, is effective to form a pair of spaced apart and continuous seals, each seal being formed along opposite sides of the inflation channel 18. The continuous seals formed by the seal forming apparatus are effective to seal off the entrance ports 20 and thereby trap a quantity of pressurized air within each pillow chamber 16. The seal forming apparatus 52 is described in greater detail below with reference to FIG. 6.

Located downstream of the seal forming apparatus 52 is what is referred to as the "take up" section 53. In the embodiment of FIGS. 3 and 4, take up section 53 comprises the combination of a second set of drive rollers 54 and a belt drive assembly 56. The take up section 53 is effective to (1) take up the slack in the preformed film material 10 by keeping the film material 10 taut in the lengthwise or longitudinal direction and (2) pull the film material 10 through the seal forming apparatus 52. The belt drive assembly 56 includes an elastomeric belt 58, preferably of silicon rubber, which loops around forward wheel 60 and rearward wheel 62. In the preferred embodiment described herein, only the rearward wheel 62 is driven, the forward wheel being free spinning. The second set of drive rollers 54 are driven at a higher rate of speed than the first set of drive rollers 46. The rearward wheel 62 of the belt drive assembly is preferably driven at an even higher rate of speed than the second set of drive rollers 54. The contact pressure between the film material 10 and the combination of second set of drive rollers 54 and belt drive assembly is light, however, such that there is sufficient drag force on the film material 10 to continue advancing it through the machine 40 but not so great a drag force that would otherwise cause the film material I 0 to separate along the perforations or score lines 21. The combination of drive rollers 54 and belt drive assembly 56 effectively form a clutch with both the drive rollers 54 and belt 58 slipping against the film material 10, but at different speeds.

Figure 7:
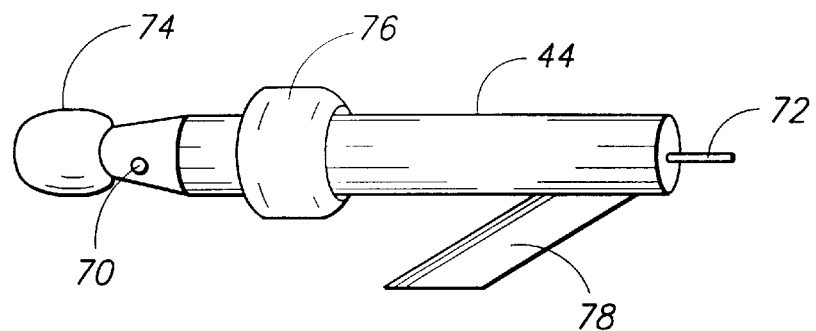
FIG. 7 is an isometric view illustrating the inflation tube tip of the automatic machinery and the incorporation of the cutting blades adjacent to the heat sealer apparatus (not shown).

Air inserted into the common channel 18 at the exiting nozzle or orifice 70 of the inflation tube 44 is regulated at the input 72 (see FIG. 7). The forward end of the inflation tube 44 is provided with a low friction ball 74, preferably made of or coated with Teflon® or a similar low fiction material. The ball 74 provides resistance to the air coming into the channel 18 and thereby focuses the air into the entrance ports 20 for the first set of pillow chambers 16 to be pressurized upon being fed into the first set of drive rollers 46 of the machine 40. The diameter of the ball 74 is selected to be slightly smaller than the inflated diameter of the channel 18 so that a small amount of air seepage is permitted and bunching up of the film material in this region is minimized. The ball 74 also helps to open up the common inflation channel 18 by separating the upper and lower layers of the film material 10. A second low friction ball 76, also preferably made of Teflon® or a similar low friction material, is positioned on the inflation tube 44 down stream of the nozzle 70. In this way, air exiting the nozzle 70 is being pressurized in the common inflation channel 18 (of the preformed film 10) between the two balls 74 and 76. The diameter of ball 76 may be a slightly bigger than the diameter of the ball 74 but still less than the diameter of the common inflation channel 18 so that bunching up of material is avoided.

The air inflation component of machine 40 also preferably includes a solenoid controlled timer and valve system (not illustrated) which provides a means for delivering several bursts of high pressure air through the nozzle 70 per bag or pillow cycle in order to rapidly inflate each pair of pillow chambers 16 as they advance by the nozzle 70. The timer is ideally set in accordance with the speed of travel of the film material 10. The pulsing of air in this manner increases the air flow pressure into the pillow chambers (due in part to the back pressure caused by the ball 76) without increasing the total air flow volume. We have found that pulsing high pressure air into the pillow chambers results in a higher percentage of fully inflated bags (pillows) with low incidence of bursting than if the bags (pillows) were merely inflated by a continuous flow of pressurized air. Inflation of the bags (pillows) using continuous high pressure air increases the air flow rate tremendously which causes the bags (pillows) to bunch up at the drive rollers 46 and burst if over pressurized. On the other hand, inflation of the bags (pillows) using continuous low pressure air decreases the air flow rate tremendously which tends to result in under inflated bags (pillows).

The inflation tube 44 is further provided with a blade 78 at a third station downstream of the ball 76 and seal forming apparatus 52. The blade 78 is generally angled and is operative to cut either one of the upper, lower or both layers of the preformed film material 10 in the region of the common inflation channel 18, thus allowing the common inflation channel 18 to separate from the tube 44 so that the strip of adjacent and connected (and now) inflated pillow sections are able to continue to progress forward through the machine 40. The blade 78 is positioned upstream of the contact point between the second set of drive rollers 54 and belt 58 such that any friction imparted by the blade onto the film material 10 is compensated for by the drag force imparted on the preformed film material 10 by the drive rollers 54 and belt 58.

As an option, the machine 40 may further include another take up roller 64 positioned downstream of the belt drive assembly 56 (see FIG. 3). The take up roller 64 is driven at a high rate of speed in order to take up the slack in the film material 10 after passing through the second set of drive rollers 54 and belt drive assembly 56. Upon exiting the second set of drive rollers 54 and belt drive assembly 56, the now air-filled and sealed pillow sections can then be separated from each other along the perforations 21 using a cutter 66 as shown to produce individual air-filled pillows or cushions 50. Alternatively, the air-filled pillow sections can be kept together as a continuous sheet which can be broken apart into pillows as desired by the end user.

Figure 6:
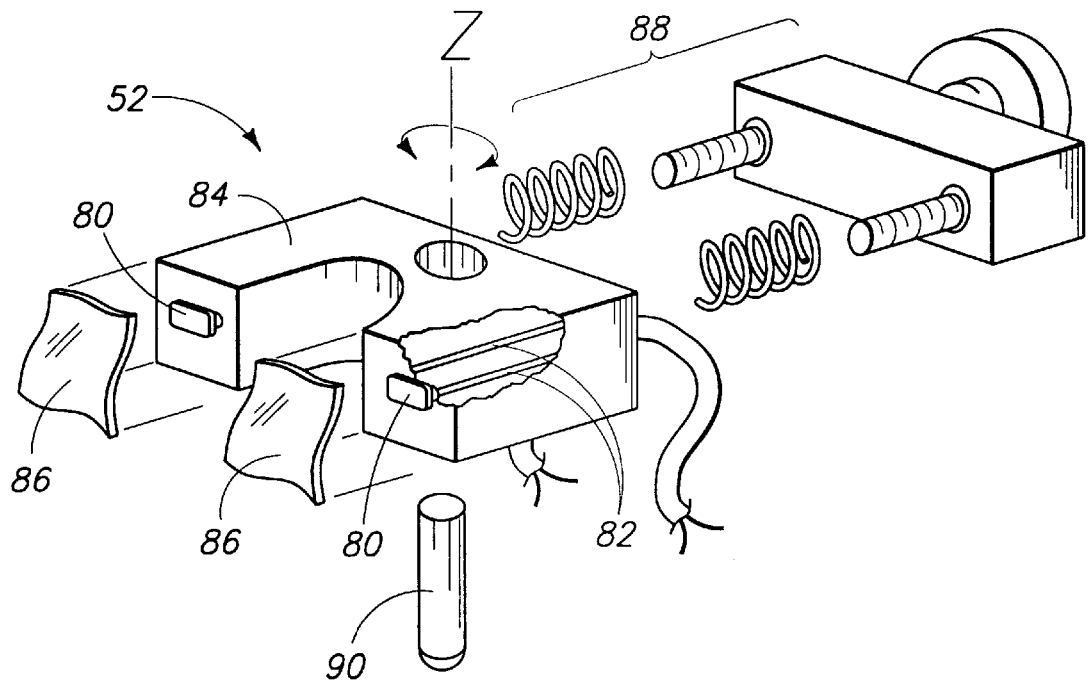
FIG. 6 is an enlarged exploded isometric view of the region encircled by arrow 6—6 in FIG. 4 showing the detail of the heat sealer apparatus.

Referring now to FIG. 6, there is shown a seal forming apparatus 52 constructed in accordance with a preferred embodiment of the present invention. The seal forming apparatus includes two small electrically regulated heating elements 80, preferably nichrome wire, that are maintained at a constant heat and are positioned, under light pressure, to contact the film material 10 as it is pulled through the machine in order to form two spaced heat seals along opposite sides of the common inflation channel 18. Each seal closes off the respective entrance port 20 for the pillow chambers 16 of each pillow section 12. In an alternate embodiment, a second set of heating elements may be employed to provide redundant parallel secondary seals as a back up to the primary seals. Each heating element 80 is welded to copper conductors 82 and supported by an insulator block 84. The actually heating area of the nichrome wire heating elements is optimized to provide efficient heating without undue heat loss through the insulator block 84 and conductors 82. Teflon( coated fiberglass tape 86 covers the heating elements 80 to provide a suitable heat conducting barrier between the heating elements 80 and the film material 10 and to prevent the build up of melted plastic on the heating elements 80. As is seen in FIG. 6, the insulated block 84 is connected to the machine 40 by an adjustable spring loaded mounting assembly 88 which permits the operator to fine tune the contact pressure of the heating elements 80 against the film material 10. The insulator block 84, being mounted on axle 90, is also permitted to pivot about a Z-axis parallel to the centerline of longitudinal center of the common inflation channel 18 of the film material 10. This facilitates in the application of balanced pressure at both contact points between the seal forming apparatus and the film material.

The machine 40 of FIGS. 3 and 4 can be equipped with a secondary folding apparatus (not shown) to create the dual pouch package described in U.S. Pat. No. 5,454,642 to De Luca Such package having pillows joined together at their exterior edges (farthest from common inflation channel 18) and products inserted within the packages before or after the folding.

Figure 8:
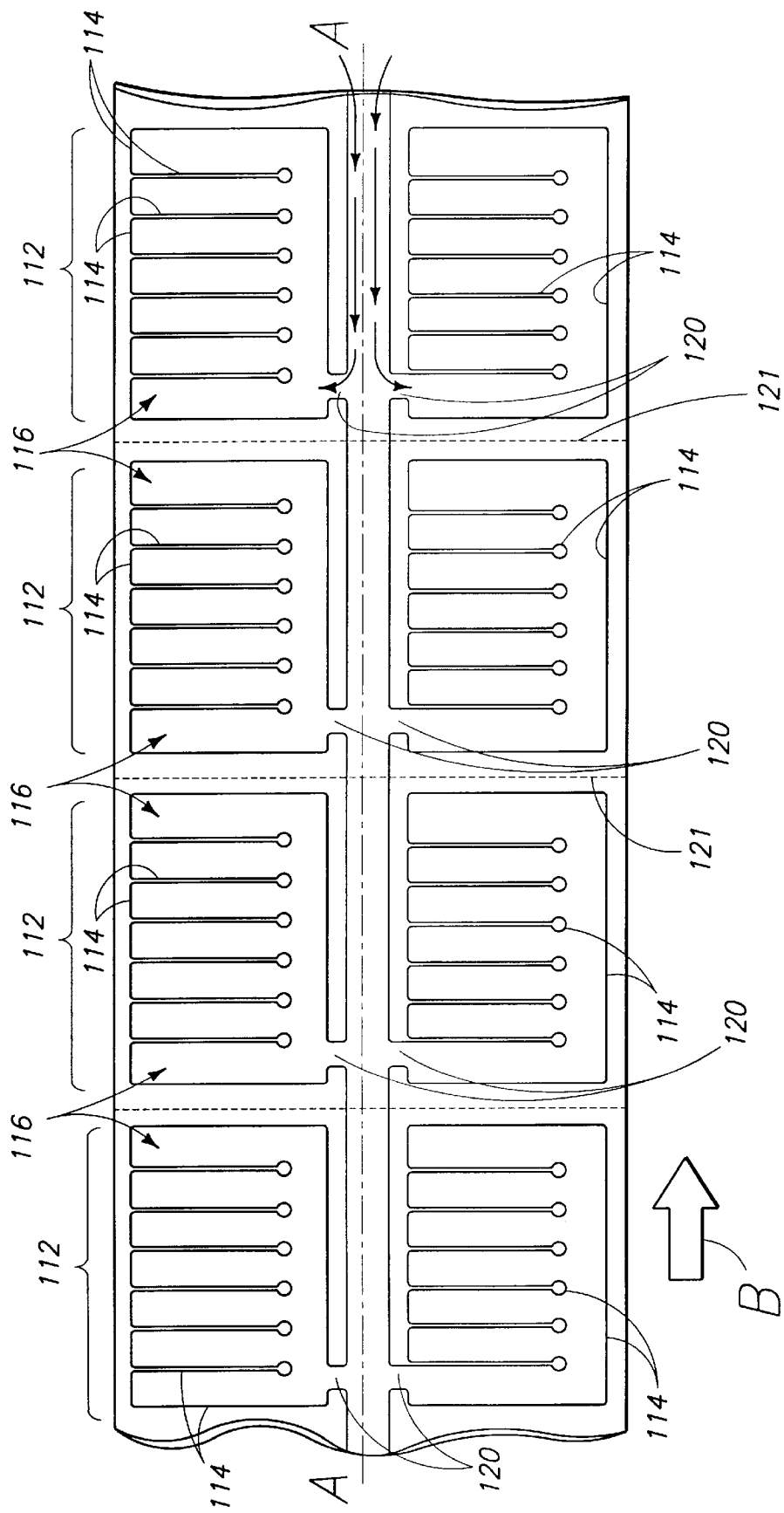
FIG. 8 is plan view of inflatable packaging material constructed in accordance with a second embodiment of the present invention.
Figure 9:
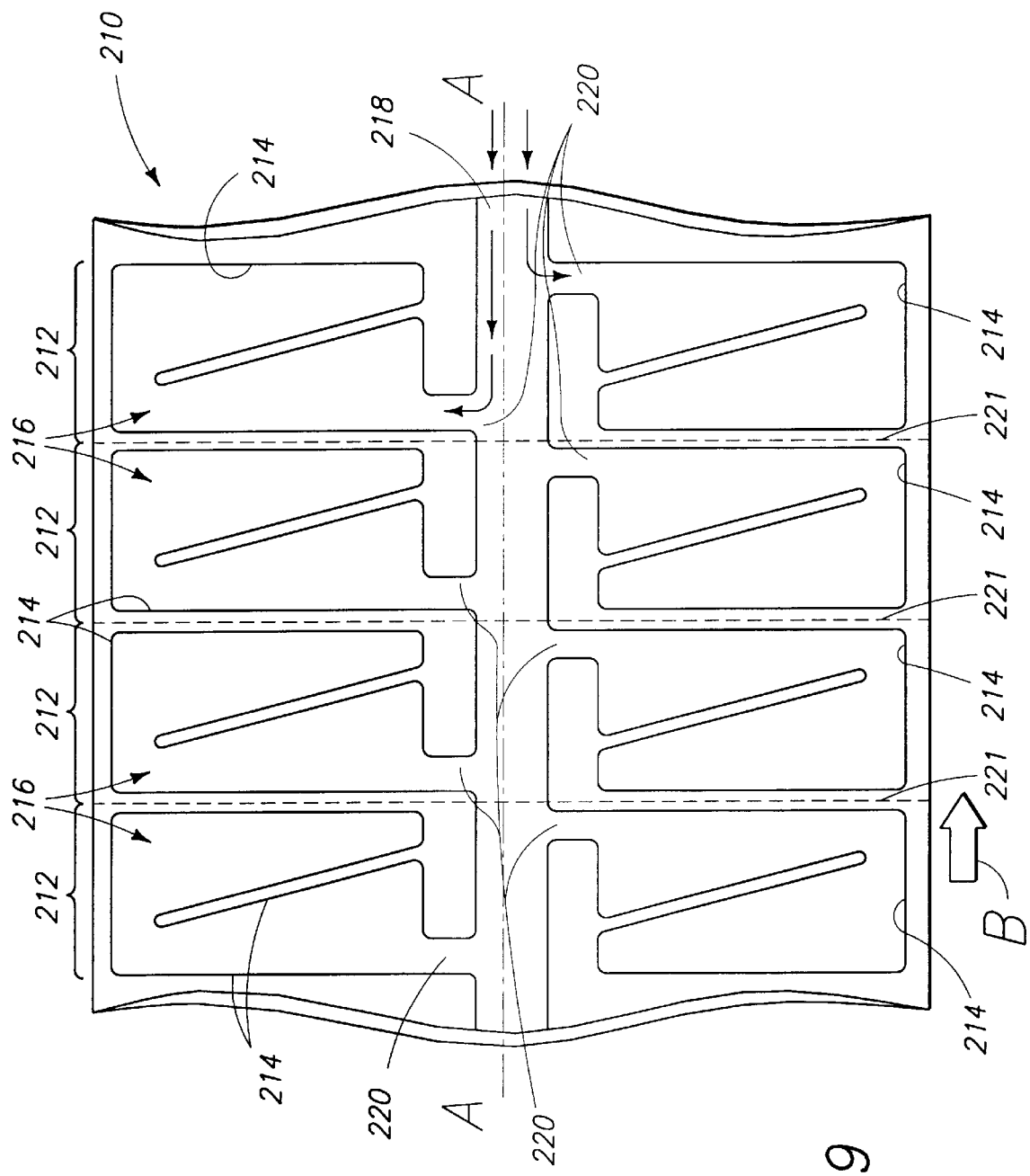
FIG. 9 is plan view of inflatable packaging material constructed in accordance with a third embodiment of the present invention.

FIGS. 8 and 9 illustrate alternate package configurations of the basic preformed film material 10 shown in FIG. 1 to create low profile inflated packages similar to bubble-wrap materials.

In FIG. 8, there is shown a plan view of a strip of preformed film material 110 provided with a sealing pattern of four connected inflatable flat pillow sections 112. Each of the flat pillow sections 112 of the patterned strip of film material 110 include continuous heat seals 114 which define two complex pillow chambers 116 emanating off of a common inflation channel 118. The common inflation channel 1 18 is centrally oriented along the longitudinal axis A—A of the patterned strip 110 and is in general alignment with the direction of travel of the strip 110 (indicated by arrow B) through the inflation and sealing apparatus. The pillow chambers 116 are connected to the common inflation channel 118 via respective entrance ports 120 which are oriented in the transverse (or widthwise) direction of the patterned strip 110 and perpendicular to the direction of travel (arrow B). The patterned strip 110 is further provided with perforations or score lines 121 that define the transverse or lateral edge boundaries of the flat pillow sections 112.

In FIG. 9, there is shown a plan view of a strip of preformed film material 210 provided with a sealing pattern of four connected inflatable flat pillow sections 212. Each of the flat pillow sections 212 of the patterned strip of film material 210 include continuous heat seals 214 which define two complex pillow chambers 216 emanating off of a common inflation channel 218. The common inflation channel 218 is centrally oriented along the longitudinal axis A—A of the patterned strip 210 and is in general alignment with the direction of travel of the strip 210 (indicated by arrow B) through the inflation and sealing apparatus (to be described infra). The pillow chambers 216 are connected to the common inflation channel 218 via respective entrance ports 220 which are oriented in the transverse (or widthwise) direction of the patterned strip 210 and perpendicular to the direction of travel (arrow B). The patterned strip 210 is further provided with perforations or score lines 221 that define the transverse or lateral edge boundaries of the flat pillow sections 212.

Figure 10:
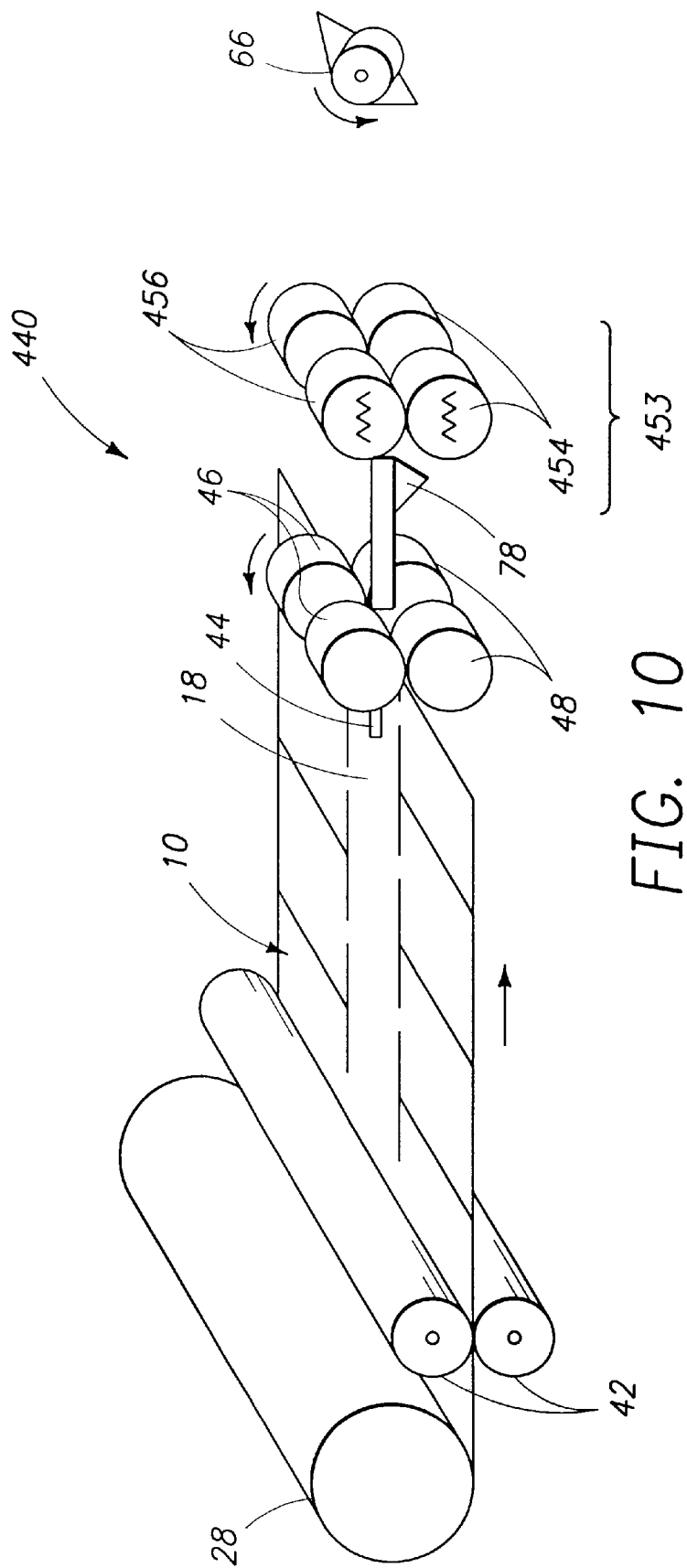
FIGS. 10 and 11 illustrate an alternate embodiment of the machine shown in FIGS. 3 and 4.
Figure 11:
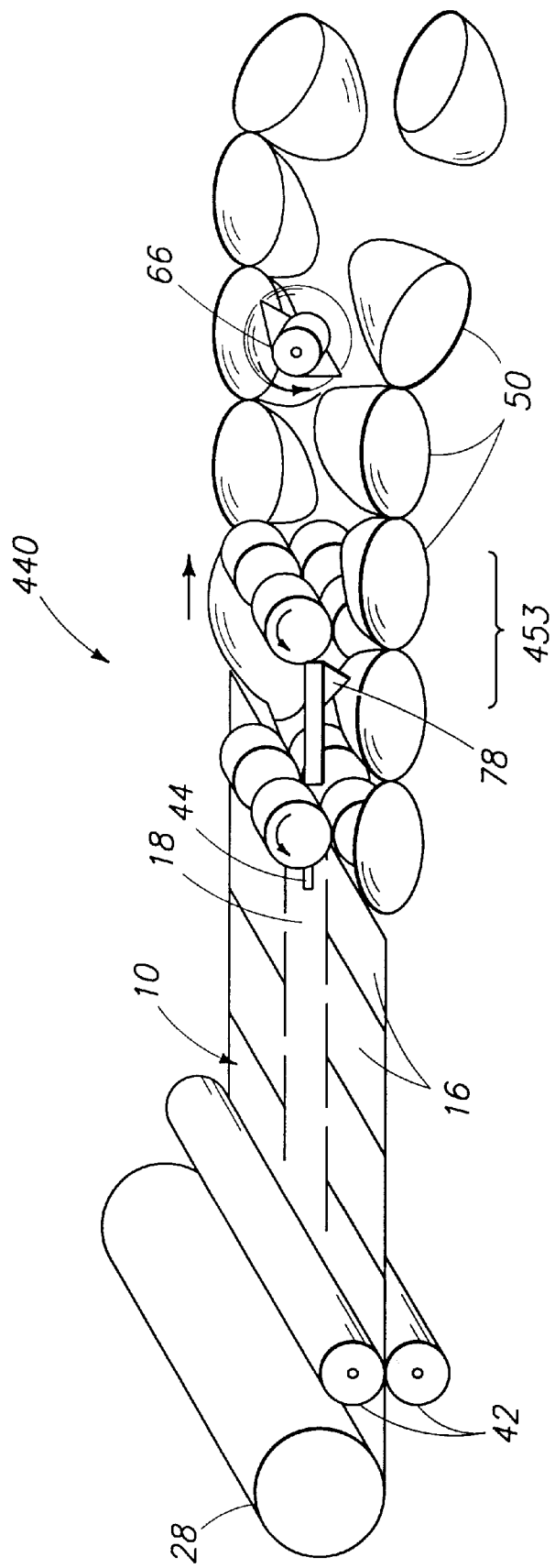

FIGS. 10 and 11 illustrate a machine 440 for producing air-filled packaging pillows in a continuous manner from a roll of preformed film material in accordance with an alternate embodiment of the invention. The machine 440 of FIGS. 10 and 11 is substantially identical to the machine 40 of FIGS. 3 and 4 with the exception of the take up section. In all other respects, structural elements of the machine 440 of FIGS. 10 and 11 common to machine 40 of FIGS. 3 and 4 are indicated by identical reference numerals. In machine 440, take up section 453 includes a pair of opposing rollers or wheels 454 and 456. Rollers 454 are free spinning and are used to heat seal the film material at the port openings of each pillow chamber. The rollers 454 are made of a heat conducting material, preferably aluminum, and are heated to a constant temperature or optionally fitted with electrically regulated nichrome heating elements. The rollers 456 are driven and are positioned in light contact with rollers 454 in order to both advance the film material 10 through the machine 440 and drive the free spinning rollers 454.

While we have illustrated and described the preferred embodiments of our invention, it is to be understood that these are capable of variation and modification. For example, it is understood that the dual bag configuration for the preformed patterned film material shown and described in FIG. 1 is capable of a number of variations depending upon user requirements. In particular, the preformed patterned film material may be configured with a sequential series of connected single compartment pillow sections each individually joined in air communication with one side edge of a common inflation channel. The inflation channel may be located along the longitudinal center line as before or may be located closer towards one side edge of the film material. Other possible configurations for the patterned preformed material may include, but not be limited to, a four bag design which includes two spaced apart longitudinally oriented common inflation channels, each having pillow chambers stemming off either side. We therefore do not wish to be limited to the precise details set forth, but desire to avail ourselves of such changes and alterations as fall within the purview of the following claims.

We claim:

1. A method of continuous production of pneumatically filled packaging pillows for use as void fill packaging for the safe shipping of articles, the method comprising the steps of:

a) providing a strip of flattened preformed film material of adjacent and connected deflated inflatable pillow sections, each pillow section having upper and lower planar flexible surfaces peripherally sealed to form a pair of adjacent flat pillow chambers intermediately joined by a common flat inflation channel therebetween and oriented in the longitudinal direction of the film material, the common inflation channel being connected to each flat pillow chamber via a respective entrance port oriented in the transverse direction of the pillow sections, each said entrance port being formed in and extending across a longitudinally extending sealable strip of the film material which is located between a side of the inflation channel and a related pillow chamber;

b) advancing the film material along a path;

c) guiding the common flat inflation channel of the advancing film material onto an inflation tube at a first station, the inflation tube having an orifice adjacent a leading end thereof;

d) inflating adjacent pairs of flat pillow chambers of the individual ones of the connected and adjacent pillow sections at the first inflating station by expelling a desired quantity of gas through the orifice of the inflation tube and into the common inflation channel and respective transversely oriented entrance ports of the adjacent pillow section;

e) forming a pair of spaced apart longitudinal heat seals to close off the respective transversely oriented entrance ports to the inflated pillow chambers at a second sealing station; said forming of the pair of spaced apart longitudinal heat seals comprising engaging a Teflon coated tape covering of a wire heating element directly on and in light pressure with and in continuous sliding contact with the film material in said sealable strip as the film material is continuously advanced without interruption during said continuous production of pneumatically filled packaging pillows; and wherein the seal across an entrance port is formed complete and secure at the time the film material is advanced out of said sliding contact at the second sealing station without the need for subsequent pressing together or cooling of the film material in the sealed entrance port; and f) slitting open the common inflation channel of the pillow section to release the inflated pillows chambers from the inflation tube at a third slitting station.

2. The method according to claim 1, wherein the film material is advanced along the path from station to station in a continuous motion.

3. The method according to claim 1, which includes the step of separating the pillow sections into separate pneumatically filled pillows at a fourth station.

4. The method according to claim 1, wherein the step of advancing the film material includes feeding the film material through a first pair of drive rollers adjacent the inflation tube and a second pair of rollers downstream of the second station.

5. The method according to claim 1, which includes the step of imparting a laterally outward tension to the film material adjacent the fist station in order to keep the film material laterally taut and to counter shrinkage of the film material upon inflation of the adjacent pairs of flat pillow chambers.

6. The method according to claim 1, wherein the step of inflating adjacent pairs of flat pillow chambers includes the step of pulsing a plurality of discreet bursts of pressurized gas through the orifice of the inflation tube.

7. The method according to claim 1, wherein the mutually adjacent and connected pillow sections of the strip of flattened preformed film material are separable from one another along common tear lines.

8. A machine for manufacturing a continuous production of pneumatically filled packaging pillows from a strip of flattened preformed film material of adjacent and connected deflated inflatable pillow sections, each pillow section having upper and lower planar flexible surfaces peripherally sealed to form a pair of adjacent flat pillow chambers intermediately joined by a common flat inflation channel therebetween and oriented in the longitudinal direction of the film material, the common inflation channel being connected to each flat pillow chamber via a respective entrance port oriented in the transverse direction of the pillow sections, each said entrance port being formed in and extending across a longitudinally extending sealable strip of the film material which is located between a side of the inflation channel and a related pillow chamber, comprising in operative combination:

a) advancing means for advancing the film material along a path;

b) guiding means for guiding the common flat inflation channel of the advancing film material onto an inflation tube at a first station, the inflation tube having an orifice adjacent a leading end thereof;

c) inflating means for inflating adjacent pairs of flat pillow chambers of the individual ones of the connected and adjacent pillow sections at the first inflating station by expelling a desired quantity of gas through the orifice of the inflation tube and into the common inflation channel and respective transversely oriented entrance ports of the adjacent pillow sections;

d) seal forming means for forming a pair of spaced apart longitudinal heat seals to close off the respective transversely oriented entrance ports to the inflated pillow chambers at a second sealing station; said seal forming means including a pair of Teflon coated tape covered wire heating elements engaged directly on and in light pressure with and in continuous sliding contact with the film material in a related sealable strip as the film material is continuously advanced without interruption during said continuous production of pneumatically filled packaging pillows; and wherein the seal across an entrance port is formed complete and secure at the time the film material is advanced out of said sliding contact at the second, sealing station without the need for subsequent pressing together or cooling of the film material in the sealed entrance port; and e) slitting means for slitting open the common inflation channel of the pillow section to release the inflated pillows chambers from the inflation tube at a third slitting station.

9. The machine according to claim 8, wherein the advancing means include means for advancing the film material from station to station in a continuous motion.

10. The machine according to claim 9, wherein the advancing means includes a first pair of drive rollers adjacent the inflation tube and a second pair of rollers downstream of the second station.

11. The machine according to claim 8, which includes separating means for separating the adjacent pneumatically filled pillow chambers into separate pneumatically filled pillows at a fourth station.

12. The machine according to claim 8, which includes tension means for imparting a laterally outward tension to the film material adjacent the first station in order to keep the film material laterally taut and to counter shrinkage of the film material upon inflation of the adjacent pairs of flat pillow chambers.

13. The machine according to claim 10, which includes tension means for imparting a laterally outward tension to the film material adjacent the first station in order to keep the film material laterally taut and to counter shrinkage of the film material upon inflation of the adjacent pairs of flat pillow chambers.

14. The machine according to claim 13, wherein the tension means include a pair of crowned rollers driven by said first pair of drive rollers.

15. The machine according to claim 8, wherein the inflating means includes pulsing means for pulsing a plurality of discreet bursts of pressurized gas through the orifice of the inflation tube.

16. The machine according to claim 8, wherein the mutually adjacent and connected pillow sections of the strip of flattened preformed film material are separable from one another along common tear lines.

17. A machine for manufacturing a continuous production of pneumatically filled packaging pillows from a strip of flattened preformed film material of adjacent and connected deflated inflatable pillow sections, each pillow section having upper and lower planar flexible surfaces peripherally sealed to form a pair of adjacent flat pillow chambers intermediately joined by a common flat inflation channel therebetween and oriented in the longitudinal direction of the film material, the common inflation channel being connected to each flat pillow chamber via a respective entrance port oriented in the transverse direction of the pillow sections, each said entrance port being formed in and extending across a longitudinally extending sealable strip of the film material which is located between a side of the inflation channel and a related pillow chamber, comprising in operative combination:

a) a plurality of rollers for advancing the film material along a path;

b) an inflation tube positioned at a first inflating station along the path and adapted to be received within the common inflation channel of the advancing film material, the inflation tube having an orifice adjacent a leading end thereof;

c) an air source connected to the inflation tube for expelling a desired quantity of gas through the orifice of the inflation tube and into the common inflation channel of the advancing film thereby causing the inflation of adjacent pairs of flat pillow chambers of the individual ones of the connected and adjacent pillow sections at the first station;

d) a heat sealer effective to seal close the respective entrance ports of the inflated pillow chambers at a second sealing station; said heat sealer including a pair of Teflon coated tape covered wire heating elements engaged directly on and in light pressure with and in continuous sliding contact with the film material in a related sealable strip as the film material is continuously advanced without interruption during said continuous product of pneumatically filled packaging pillows; and wherein the seal across an entrance port is formed complete and secure at the time the film material is advanced out of said sliding contact at the second sealing station without the need for subsequent pressing together or cooling of the film material in the sealed entrance port; and e) a blade for slitting open the common inflation channel of the pillow section to release the inflated pillows chambers from the inflation tube at a third slitting station.

18. The machine according to claim 17, wherein the plurality of rollers include driven rollers that advance the film material from station to station in a continuous motion.

19. The machine according to claim 17, which includes a separator for separating the adjacent pneumatically filled pillow chambers into separate pneumatically filled pillows at a fourth station.

20. The machine according to claim 17, wherein the plurality of rollers includes a pair of driven rollers for advancing the film material through the first station and a pair of crowned rollers effective to keep the film material laterally taut and to counter shrinkage of the film material upon inflation of the adjacent pairs of flat pillow chambers at the first station.

21. The machine according to claim 17, wherein the air source is regulated to pulse a plurality of discreet bursts of pressurized gas through the orifice of the inflation tube per each pillow section cycle through the first station.

22. The machine according to claim 17, wherein the mutually adjacent and connected pillow sections of the strip of flattened preformed film material are separable from one another along common tear lines.

23. The machine according to claim 17, wherein the heat sealer includes a pair of spaced apart heating elements mounted on a spring biased support member which is also pivotal about a central axis to permit even distribution of contact pressure between each of the two heating elements against the film material as the film material is advanced through the second sealing station.

24. A method of continuous production of pneumatically filled packaging pillows for use as void fill packaging for the safe shipping of articles, the method comprising the steps of:

a) providing a strip of flattened preformed film material of adjacent and connected deflated inflatable pillow sections, each pillow section having upper and lower planar flexible surfaces peripherally sealed about its entire periphery except for a narrow width, unsealed entrance port extending through one side portion of the pillow section periphery, said adjacent pillow sections being arranged in at least one row which extends longitudinally in the direction of advance of the film material along a path through a pillow inflating and sealing apparatus, each pillow section being connected by its entrance port to a common flat inflation channel which is formed in the film material and which extends in the longitudinal direction of movement of the film material along said path, each said entrance port being formed in and extending across a longitudinally extending sealable strip of the film material which is located between a side of the inflation channel and a related pillow chamber;

b) advancing the film material along said path through a pillow inflating and sealing apparatus;

c) guiding the common flat inflation channel of the advancing film material onto an inflation tube at a first inflating station, the inflation tube having an orifice adjacent a leading end thereof;

d) inflating individual ones of the connected and adjacent pillow sections at the first inflating station by expelling a desired quantity of gas through the orifice of the inflation tube and into the common inflation channel and through the transversely oriented entrance port of the pillow section;

e) forming at least one longitudinally extending heat seal across the narrow width of the entrance port of an inflated pillow section to close off the transversely oriented entrance port to the inflated pillow chamber at a second sealing station, said forming of the heat seal comprising engaging a Teflon coated tape covering of a wire heating element directly on and in light pressure with and in continuous sliding contact with the film material in said sealable strip as the film material is continuously advanced without interruption during said continuous production of pneumatically filed packaging pillows: and wherein the seal is formed complete and secure at the time the film material is advanced out of said sliding contact at the second sealing station without the need for subsequent pressing together of the film material or cooling of the film material in the sealed entrance port; and f) slitting open the common inflation channel of the pillow section to release the inflated pillow chambers from the inflation tube at a third station.

25. A machine for manufacturing a continuous production of pneumatically filled packaging pillows from a strip of flattened preformed film material of adjacent and connected deflated inflatable pillow sections, each pillow section having upper and lower planar flexible surfaces peripherally sealed about its entire periphery except for a narrow width, unsealed entrance port extending through one side portion of the pillow section periphery, said adjacent pillow sections being arranged in at least one row which extends longitudinally in the direction of advance of the film material along a path through a pillow inflating means and seal forming means, each pillow section being connected by its entrance port to a common flat inflation channel which is formed in the film material and which extends in the longitudinal direction of movement of the film material along said path, each said entrance port being formed in and extending across a longitudinally extending sealable strip of the film material which is located between a side of the inflation channel and a related pillow chamber;

each entrance port being oriented in a direction which is transverse to the longitudinal direction of movement of the film material, said machine comprising in operative combination:

a) advancing means for advancing the film material along a path through a pillow inflating means and seal forming means;

b) guiding means for guiding the common flat inflation channel of the advancing film material onto an inflation tube at a first station, the inflation tube having an orifice adjacent a leading end thereof;

c) inflating means for inflating individual ones of the connected and adjacent pillow sections at the first station by expelling a desired quantity of gas through the orifice of the inflation tube and into the common inflation channel and through the transversely oriented entrance port of the pillow section;

d) seal forming means for forming at least one longitudinally extending heat seal across the narrow width of the entrance port of the inflatable pillow section as the inflated pillow section and preformed film material is continuously moved longitudinally along said path to close off the transversely oriented entrance port to the inflated pillow chamber at a second sealing station; said seal forming means including a Teflon coated tape covered wire heating element engaged directly on and in light pressure with and in continuous sliding contact with the film material in the sealable strip as the film material is continuously advanced without interruption during said continuous production of pneumatically filled packaging pillows; and wherein the seal across an entrance port is formed complete and secure at the time the film material is advanced out of said sliding contact at the second sealing station without the need for subsequent pressing together or cooling of the film material in the sealed entrance port; and e) slitting means for slitting open the common inflation channel of the pillow section to release the inflated pillow chambers from the inflation tube at a third station.

* * * * *